US011883965B2

(12) United States Patent
Boudreau et al.

(10) Patent No.: US 11,883,965 B2
(45) Date of Patent: Jan. 30, 2024

(54) COGNITIVE ROBOTIC TOOL SELECTOR AND APPLICATOR

(71) Applicant: INTERNATIONAL BUSINESS MACHINES CORPORATION, Armonk, NY (US)

(72) Inventors: Michael K. Boudreau, Orange, CA (US); Victor Povar, Vancouver (CA); Sarbajit K. Rakshit, Kolkata (IN); Craig M. Trim, Ventura, CA (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 16/003,467

(22) Filed: Jun. 8, 2018

(65) Prior Publication Data
US 2019/0375108 A1    Dec. 12, 2019

(51) Int. Cl.
*B25J 9/16* (2006.01)
*B25J 11/00* (2006.01)

(52) U.S. Cl.
CPC ........... *B25J 9/1697* (2013.01); *B25J 9/1666* (2013.01); *B25J 11/005* (2013.01); *G05B 2219/40589* (2013.01)

(58) Field of Classification Search
CPC ........... G05B 2219/33018; G05B 2219/39311; G05B 19/4065; G05B 19/40938; G05B 2219/25294; G05B 2219/36351; G05B 2219/39467; G05B 2219/39468; G05B 2219/40589; G05B 2219/40564; G06K 9/6217; G06K 9/6256; G06N 20/00; G06T 2207/20081; B25J 9/16; B25J 9/1694; B25J 9/1697; B25J 9/1656; B25J 9/1658; B25J 9/1661; B25J 9/1666; B25J 11/005; B25J 11/008
See application file for complete search history.

(56) References Cited

U.S. PATENT DOCUMENTS 8,886,829 B1 * 11/2014 Poursohi ................. H04L 67/10
709/238
2014/0012415 A1    1/2014 Benaim et al.

OTHER PUBLICATIONS

"Paulo Abelha, A Model-Based Approach to Finding Substitute Tools in 3D Vision Data, May 2016" (Year: 2016).*
"Alejandro Agostini, Using Structural Bootstrapping for Object Substitution in Robotic Executions of Human-like Manipulation Tasks, Oct. 2015" (Year: 2015).*

(Continued)

*Primary Examiner* — Khoi H Tran
*Assistant Examiner* — Sarah A Tran
(74) *Attorney, Agent, or Firm* — Peter Suchecki

(57) ABSTRACT

Robotic processor embodiments determine via graphical image analysis physical attributes of an engagement area of a work-piece that a specified tool physically engages to execute a specific action. The processors identify a model set plurality of alternate substitute tools that are each available within a physical environment of the engagement area and have a body portion with physical dimensions that conform to physical dimensions of the work-piece engagement area, and thereby select a substitute tool that has a body portion that best conforms to the physical dimensions of the work-piece engagement area and meets constraints for substitute tool selection for executing the specific action.

18 Claims, 6 Drawing Sheets

(56) References Cited

OTHER PUBLICATIONS

"Ali Oral, Automated cutting tool selection and cutting tool sequence optimization for rotational parts, Apr. 2004" (Year: 2004).*
Peter Mell et al, The NIST Definition of Cloud Computing, National Institute of Standards and Technology, Publication 800-145, 2011, entire document.
Stephen Whitlow et al, Cognitive Characteristic Tool, IP.com No. IPCOM000202220D, Honeywell International Inc., 2010, entire document.
Disclosed Anonymously, Aggregate Separation of Duties Analysis Tool, IP.com No. IPCOM000206259D, 2011, entire document.
Disclosed Anonymously, Method and System for Protocol Oriented Behavior of Robot Interfaces in Cognitive Models, IP.com No. IPCOM000247234D, 2016, entire document.
Gabriele Bleser et al, Cognitive Learning, Monitoring and Assistance of Industrial Workflows Using Egocentric Sensor Networks, PLOS|one, 2015, entire document.

* cited by examiner

COGNITIVE ROBOTIC TOOL SELECTOR AND APPLICATOR

BACKGROUND

The term "robot" generally refers to a programmable machine capable of carrying out a complex series of manual actions automatically and autonomously (without the direct supervision or control of a human manager). Robots may assist or replace humans in performing a wide variety of tasks and are often deployed to perform repetitive or dangerous tasks which humans prefer not to do, or are unable to do because of size limitations, or which take place in extreme environments such as outer space or the bottom of the sea, or otherwise where the costs involved in deployment are less than the costs identified in using a human to perform a specified task.

SUMMARY

In one aspect of the present invention, a computerized method for cognitive robotic substitute tool selection and application includes executing steps on a computer processor. Thus, a computer processor is configured to, in response to determining that a specified tool is not available for use in executing a specific action on a work-piece, determine via graphical image analysis physical attributes of an engagement area of the work-piece that the specified tool physically engages to execute the specific action. The configured processor identifies a model set plurality of alternate substitute tools that are each available within a physical environment of the engagement area and have a body portion with physical dimensions that conform to physical dimensions of the work-piece engagement area. The configured processor thereby selects a substitute tool that has a body portion that best conforms to the physical dimensions of the work-piece engagement area and meets constraints for substitute tool selection for executing the specific action.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to, in response to determining that a specified tool is not available for use in executing a specific action on a work-piece, determine via graphical image analysis physical attributes of an engagement area of the work-piece that the specified tool physically engages to execute the specific action. The configured processor identifies a model set plurality of alternate substitute tools that are each available within a physical environment of the engagement area and have a body portion with physical dimensions that conform to physical dimensions of the work-piece engagement area. The configured processor thereby selects a substitute tool that has a body portion that best conforms to the physical dimensions of the work-piece engagement area and meets constraints for substitute tool selection for executing the specific action.

In another aspect, a computer program product for cognitive robotic substitute tool selection and application has a computer-readable storage medium with computer readable program code embodied therewith. The computer readable hardware medium is not a transitory signal per se. The computer readable program code includes instructions for execution which cause the processor to, in response to determining that a specified tool is not available for use in executing a specific action on a work-piece, determine via graphical image analysis physical attributes of an engagement area of the work-piece that the specified tool physically engages to execute the specific action. The processor is thereby caused to identify a model set plurality of alternate substitute tools that are each available within a physical environment of the engagement area and have a body portion with physical dimensions that conform to physical dimensions of the work-piece engagement area. The processor is thereby caused to select a substitute tool that has a body portion that best conforms to the physical dimensions of the work-piece engagement area and meets constraints for substitute tool selection for executing the specific action.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
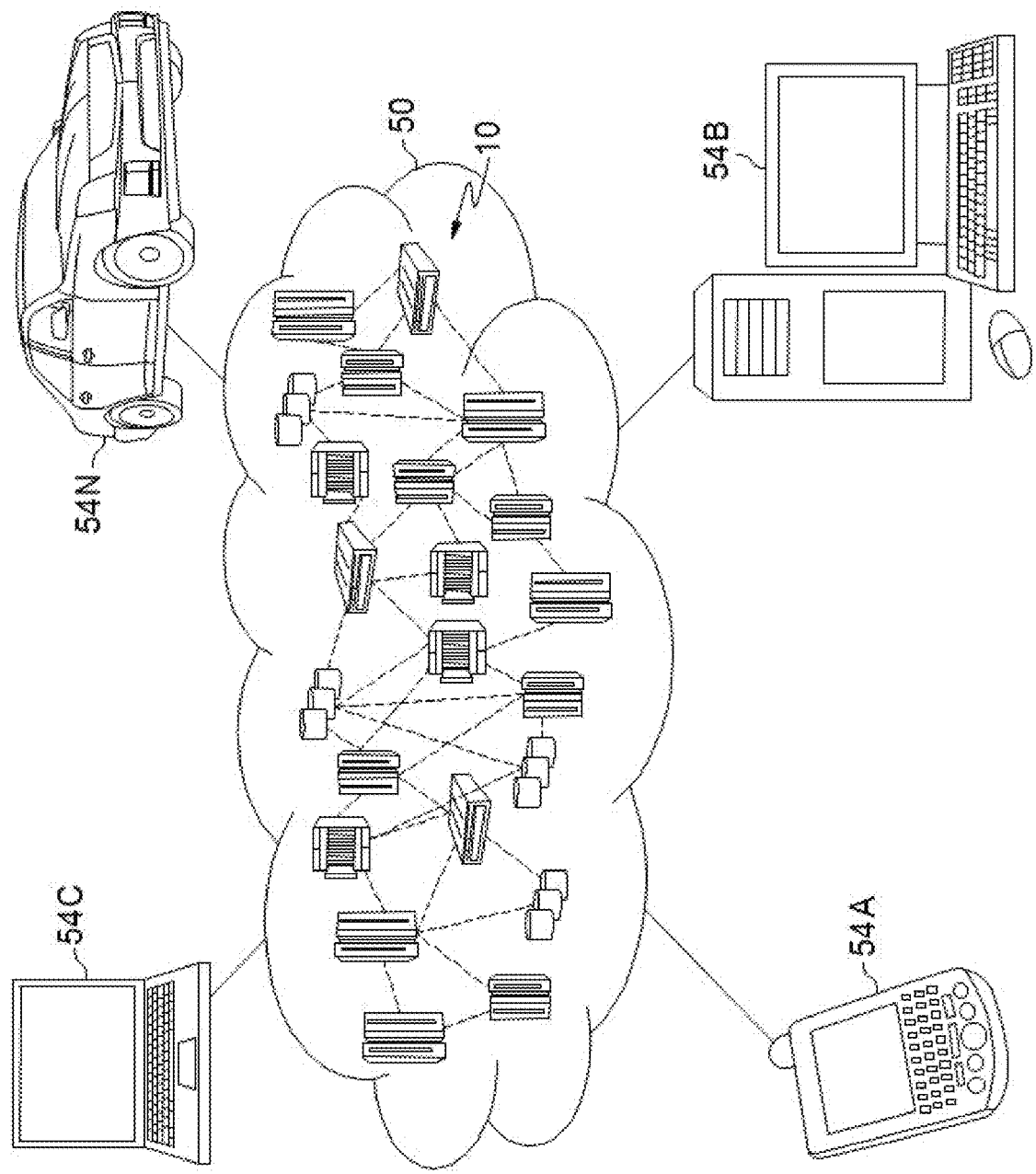
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
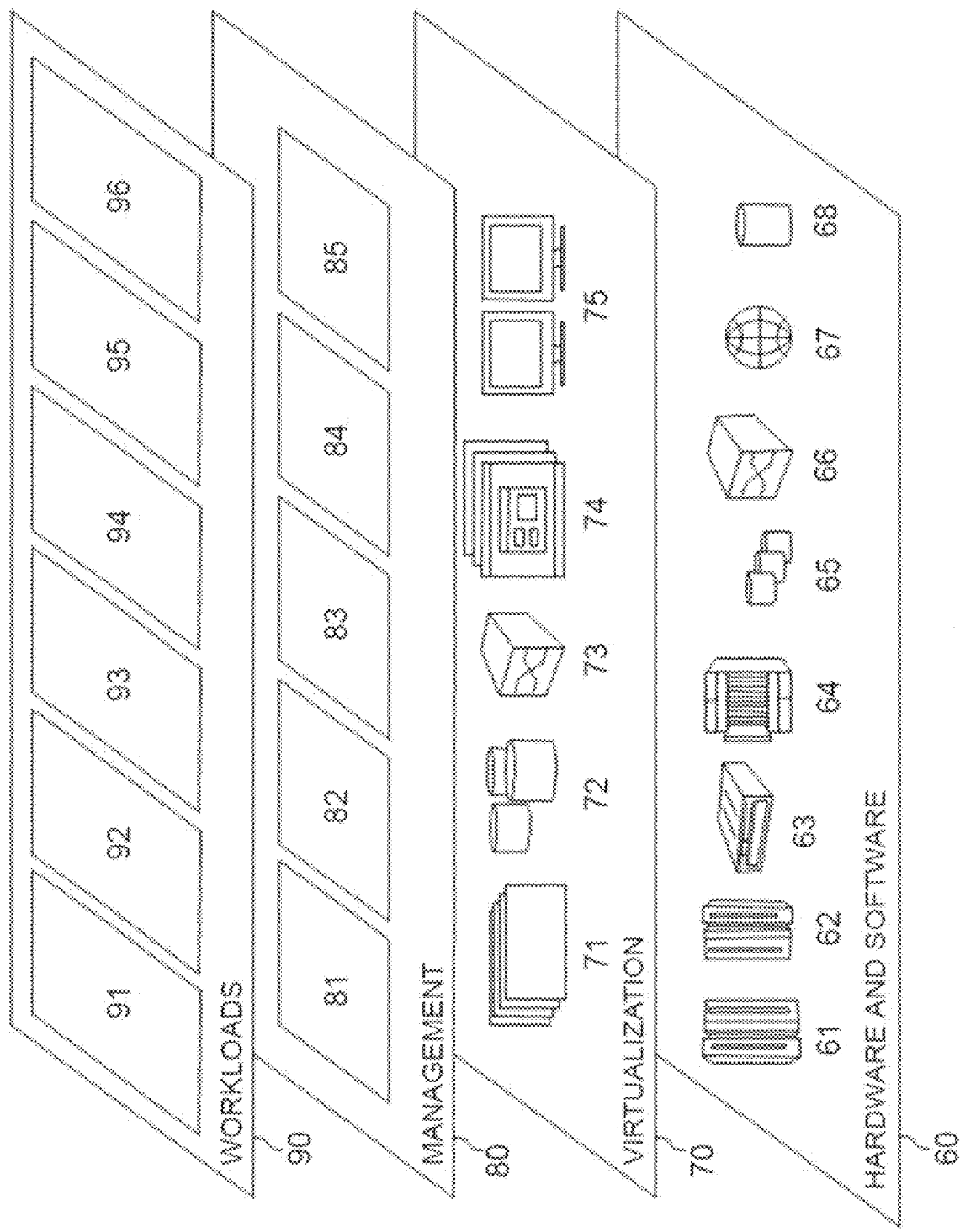
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for cognitive robotic tool selection and application according to embodiments of the present invention 96.

Figure 3:
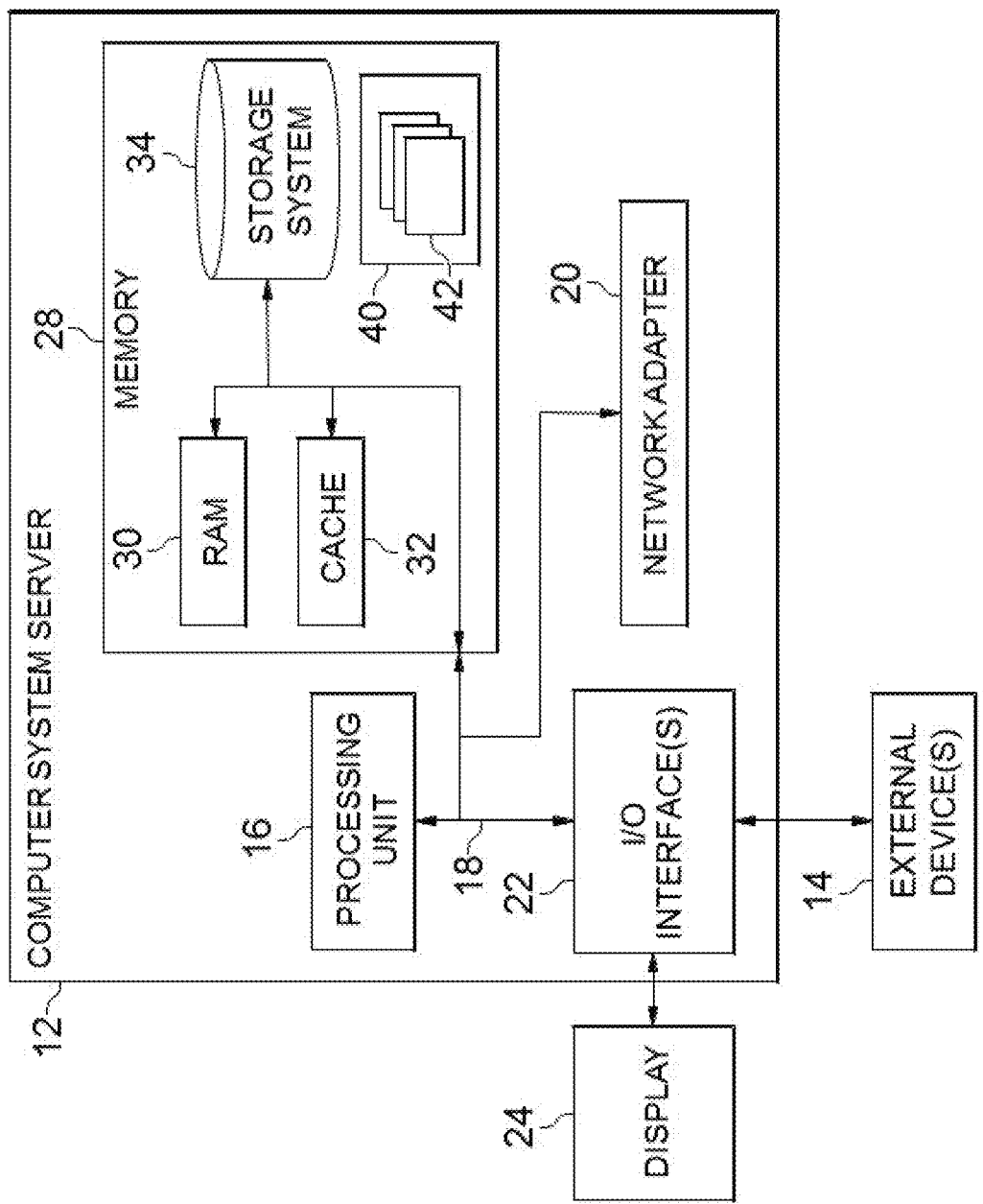
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
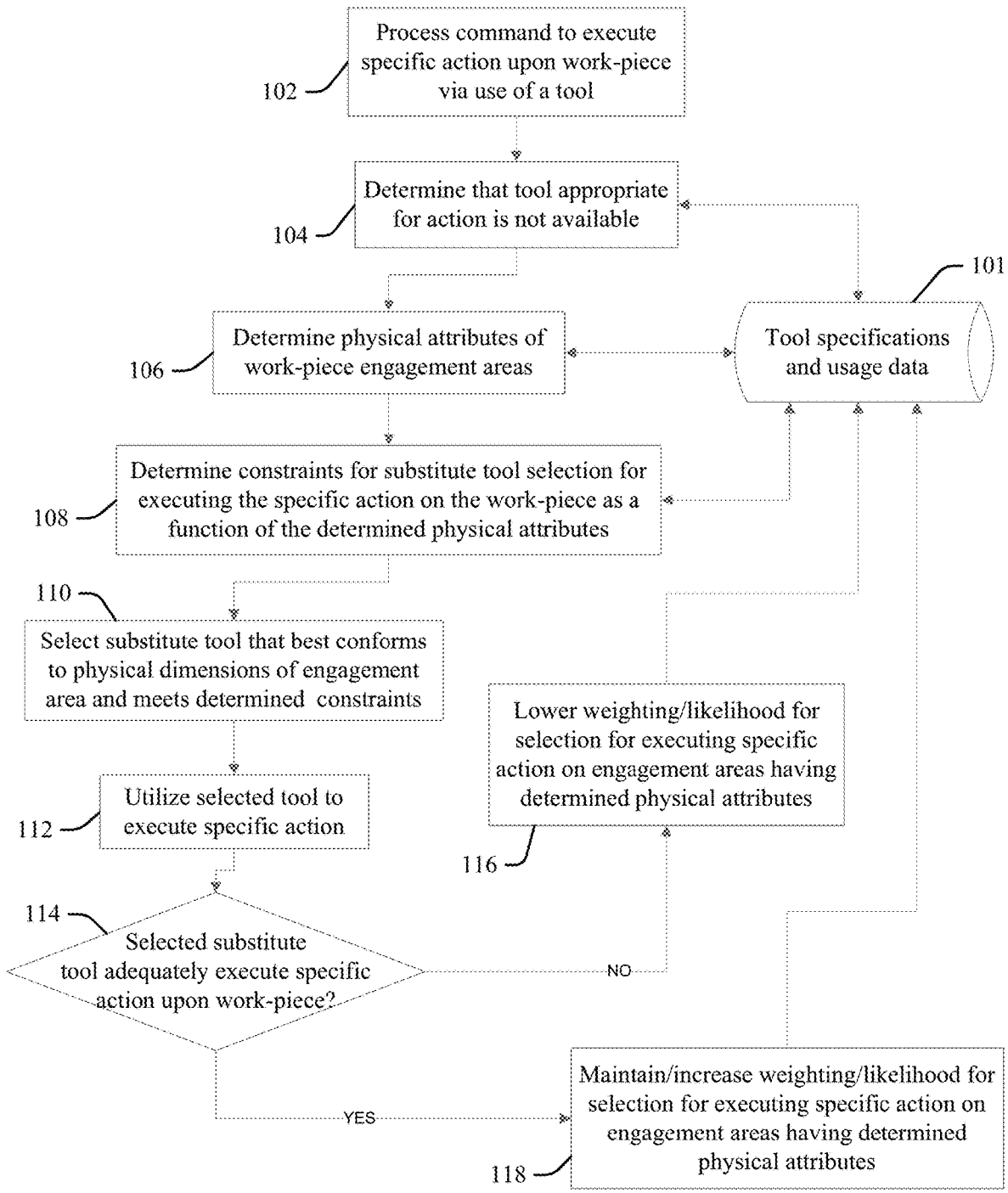
FIG. 4 is a flow chart illustration of an embodiment of the present invention.

FIG. 4 illustrates cognitive robotic tool application according to embodiments of the present invention. A robotic device processor (for example, a central processing unit (CPU)) executes code (such as code installed on a storage device in communication with the processor) and is thereby configured according to the present invention (a "configured processor") to receive and understand (process) an input command at 102 to execute a specific mechanical or physical action upon a work-piece via use of a tool.

At 104 the configured processor determines that a tool that is indicated within a tool data repository 101 (for example, a database of information indexed to a storage memory device, a cloud resource, etc.) as appropriate for executing the action is not available. For example, where the physical action is "unscrew a No. 2 standard-head (single-slot) machine screw," and a tool indicated by the action command data, or by data within the tool data repository 101, as specified or appropriate for the action is a "No. 2 standard-head screwdriver" that fits a rotating tool of the robot, the configured processor determines at 104 that the specified socket bit is missing from a tool box provided to the robot. The tool data repository 101 includes historical data and information about previous executions of the specific action on the work-piece by historic tools inclusive of the specific tool and of other, different, substitute tools.

At 106, in response to determining that the specified tool is not available for use in executing the specific action on the work-piece, the configured processor determines physical attributes (illustrative but not limiting or exhaustive example include dimensions, material qualities, environmental context, etc.) of the work-piece "engagement area": the area or areas that the specified tool physically engages to execute the specific action. More particularly, the configured processor measures or otherwise determines physical attributes of regions or areas of engagement of the respective work-piece and of tools that historically engage said engagement areas in executing the specified action in historic data within the tool data repository 101 ("historic tools") that include the specified tool. The determined physical dimensions and attributes may include physical shapes, height, width, depth and other dimensions, orientations, and atmospheric and environmental attributes (temperature, pressure, winds, presence or absence of water, lubricants, etc.); ranges of, or constraints on, motion of the historic tools or work-piece in executing the specific action within the physical attributes of the engagement action area; dimensions of other supporting devices used during execution of the action (supporting walls, ledges, lips or other resting or aligning surfaces; strapping, chains, and other constraining or force transferring components, etc.); and still other attributes descriptive of the engagement areas will be apparent to one skilled in the art. The determinations at 106 may be retrieved from or based upon historic or other data stored in the tool data repository 101 or available thereto (for example, through a network communication to another, cloud resource), or they may be made by the configured processor via analyzing image data or other data representative of the engagement areas, including as discussed below in other embodiments of the present invention.

At 108 the configured processor determines, identifies or defines constraints for substitute tool selection for executing the specific action on the work-piece as a function of the determined physical attributes of the engagement; illustrative but not limiting or exhaustive examples include cost and priority constraints; maximum and minimum shape dimensions (for example, tool lip thickness that will fit within a "No. 2 standard-head screw slot"), material composition, material strength or modulus; compatibility of material properties to the engagement area atmospheric and environmental attributes (for example, water or liquid-resistant surfaces or material integrity for operations in the rain or under water, spark-free surface treatments within potential explosive atmospheres; non-conductive properties with respect to electrified engagement areas); maximum or minimum replacement costs or risk of loss amounts associated with damage to the substitute tool or work-piece from improper or deficient performance in executing the action; and still other constraints will be apparent to one skilled in the art.

At 110 the configured processor selects a substitute tool that has a body portion and/or other attributes that best conform to the physical dimensions of the work-piece engagement area and meets the constraints determined at 108 from a universe of possible tools, and at 112 utilizes the selected tool to execute the specific action. More particularly, the robotic system processor performs a feasibility analysis on selected ones of a universe of alternate tool or solution objects to select a best or lowest-cost one based on data obtained from historical data analysis. For example, the configured processor determines from previous iterations or analysis that thin paper strips cannot be used as an adequate substitute for a bandage roll to dress a wound (due to body fluids seeping through, failure to conform to and seal a wound opening from air or contaminants, failure to maintain structural integrity and remain in place for an adequate time, etc.). The configured processor may also identify that a cloth object may function as a substitute for the bandage roll in dressing a wound, and between two different cloth objects select a clean rag over a dress shirt object for use, in recognition that the rag has no replacement cost while replacement of the dress shirt will incur a financial cost. Further, if a context constraint indicates that stopping bleeding immediately is required (due to a severe wound), satisfactory execution of the action may be prioritized over cost, wherein the material cost is weighted lower or disregarded and, so that the best option for dressing the wound is selected regardless of cost of replacement.

Feasibility analysis at 110 may include the use of cloud server or other networked resources to gather material properties and determine resultant operative capacities. Embodiments of a robotic system perform contextual analysis at 110 of the action to be performed, determining amount of force required, direction of applied force, type of applied action, how the action is to be performed, etc., and identify and select alternate solutions or tools based on feasibility and cost-benefit analysis. Cost-benefit analysis generally considers priority and importance of the action and the cost of using each alternate solution or tool. Thus, in response to determining that the risk of loss or other cost of the use any identified substitute tool exceeds a threshold at 110, the configured processor refrains from execution of the action, pauses, until the specified or required tool becomes available, or the cost drops below the threshold in another iteration of determination of the cost (for example, in response to dynamic update of the constraints determined at 108, or of the tool specification and usage data 101).

Some embodiments of the present invention may also dynamically learn and improve substitute tool selection and utilization processes, such as those performed at 110 or at 112. Thus, in response to user feedback, at 114 the configured processor of the present example determines whether the selected substitute tool adequately executed the specific action upon the work-piece, and updates the historic data accordingly. More particularly, in response to determining at 114 that the selected substitute tool did not adequately execute the specific action upon the work-piece ("No" condition), at 116 the configured processor lowers weightings (likelihoods, score values, confidences, etc.) used for selection of the selected tool for executing the specific action on work-piece engagement areas having the same or similar determined physical attributes in subsequent iterations of the process at 110, thereby lowering the frequency or possibility that a tool have a poor performance quality is selected again for use in executing the specific action in a similar engagement context.

Otherwise, in response to determining at 114 that the selected substitute tool adequately executed the specific action upon the work-piece ("Yes" condition), at 118 the configured processor maintains or increases the weightings, etc., used for selection of the selected tool for executing the specific action on the work-piece engagement areas having the same or similar determined physical attributes in subsequent iterations at 110, thereby maintaining or increasing a frequency, likelihood or possibility that a tool determined to have adequate performance is selected again for use in executing the specific action.

Figure 5:
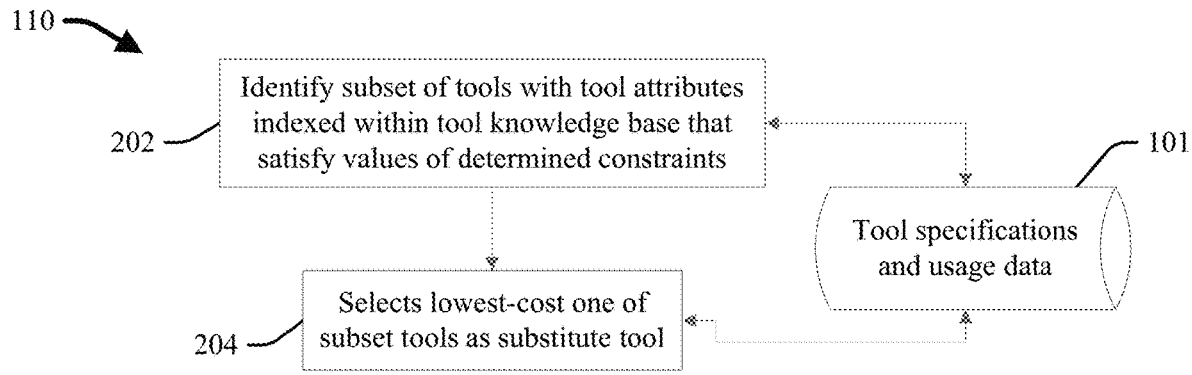
FIG. 5 is a flow chart illustration of another embodiment of the present invention.

FIG. 5 illustrates one embodiment of the present invention that selects a substitute tool that has attributes that meet determined constraints (at 110 of FIG. 4) as a function of searching a knowledge base of substitute tool attributes that are most likely to meet the determined constraints. Thus, at 202 a processor configured according to the present invention ("configured processor") compares values of the determined constraints (for example, rectangular tool lip with thickness less than but within 75% of width dimension of "No. 2 standard-head screw slot"; formed by material having a strength or modulus value of no less than 105% percent of a torque required to unscrew a work-piece screw; material resistant to dissolution or structural compromise in water, for an under-water execution constraint; and having a maximum replacement cost value below a risk threshold, reflecting risk of damage for use of tool outside scope of designed function) to tool attributes indexed within a tool knowledge base of the tool data repository 101, to thereby identify a subset of tools of a universe of possible tools that have tool attributes indexed within the tool knowledge base that match or satisfy the values of the determined constraints.

At 204 the configured processor selects a lowest cost one of the subset of tools as the tool substitute. For example, where a plastic spoon and a metal spoon each have handle tip attributes indexed within the tool data repository 101 that meet the constraints as to rectangular tool lip thickness, strength/modulus value of no less than 105% percent of a torque required to unscrew the work-piece screw; material resistant to dissolution or structural compromise in water; and maximum replacement cost value below the risk threshold; the configured processor selects the metal spoon over the plastic spoon at 204 as a function of determining that the metal spoon has a lower risk of failure cost due to use outside the scope of its designed function (namely, as an eating utensil, not a tool to impart torque forces). The determination of lower cost may also be based on determining a corresponding lower risk or exposure to lost time and/or resource expenditures to replace the failed tool, and repeat with another substitute tool, as the metal material is stronger than the plastic handle material.

Figure 6:
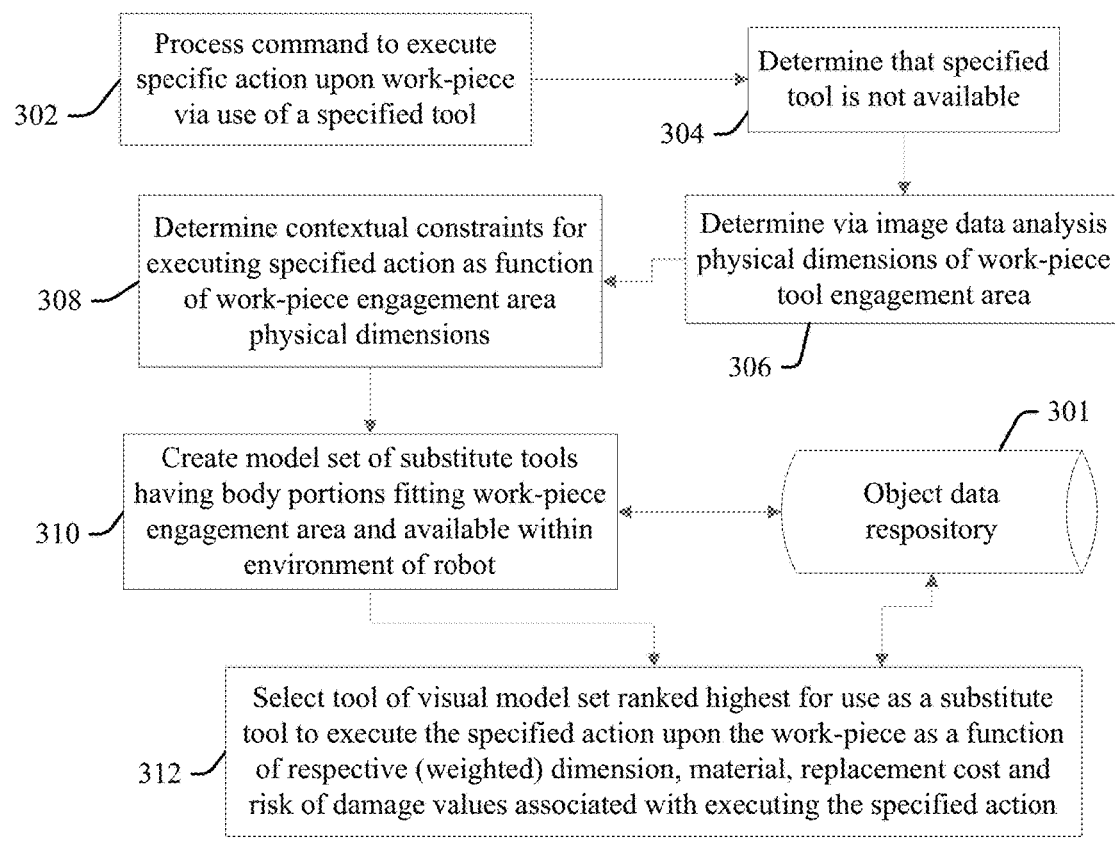
FIG. 6 is a flow chart illustration of another embodiment of the present invention.

FIG. 6 illustrates another embodiment of the present invention that selects a substitute tool that has attributes that meet determined constraints as a function of a visual analysis of work-piece engagement areas. Thus, at 302 a robotic device processor configured according to the present invention ("configured processor") receives and understands (processes) an input command to execute a specific mechanical or physical action upon a work-piece via use of a specific (specified) tool. At 304 the configured processor determines that the specified tool is not available. For example, wherein the physical action specified for execution as processed or recognized at 302 is "unscrew a No. 2 standard-head (single-slot) screw," the work-piece is a No. 2 standard-head (single-slot) screw (such as the screw 402 illustrated in FIG. 7), and the specified tool is a "No. 2 standard-head screwdriver" (such as the screwdriver 404 illustrated in FIG. 7) that fits a rotating tool attachment appendage of the robot (not shown), the configured processor determines at 304 that no screwdriver meeting the specification is available to the robot (it is missing from a designated supply area, etc.).

In response to determining that the specified tool is unavailable, at 306 the configured processor determines, via image data analysis, physical dimensions of a "tool engagement area" of the work-piece that is engaged by the missing, specified tool to execute the specified job or action. Thus, the configured processor acquires image data of the work-piece engagement area from a camera device or other source and analyzes the image data to determine physical dimensions that include length, depth and width of the work-piece area engaged by the specified tool: for example, length, depth and width dimensions of the slot 403 of the screw head 402 illustrated in FIG. 7.

At 308 the configured processor determines contextual constraints for executing the specified action as a function of image analysis of the work-piece engagement area and the physical environment of the engagement area. The contextual constraints may include a force estimated to be required to be imparted by a substitute tool on the work-piece: in the example of FIG. 7, an insertion force required to engage the screw head slot 403, and a rotation toque required to unscrew the work-piece screw 402, determined (via image data analysis) from identification of the work-piece materials and size conditions in view of the physical attributes, wherein different identified values of work-piece materials (plastic, wood, metal, aluminum, brass, etc.) shaft diameters (as estimated from size of screw head determined from image data), and environmental conditions (lubrication visible or not, rust visible or not, under water, indoors or exterior, weathered conditions, etc.) result in corresponding different determinations of the minimum insertion force and torque requirements for substitute tool selections by the configured processor.

Determining contextual constraints at 308 may also include determining length, depth and width dimensions of an "operating area" that encompasses the engagement area in an orientation affording access to a tool to physically engage the engagement area and execute the specific action in directions of motion required to generate forces determined for the executed action. Thus, the configured processor may process image data of the work-piece engagement area and operating area that is acquired by a camera or other image data sensor to determine respective measurements of the work-piece engagement and operating areas, to thereby estimate maximum tool displacement diameters defined by motion of the tool.

Figure 7:
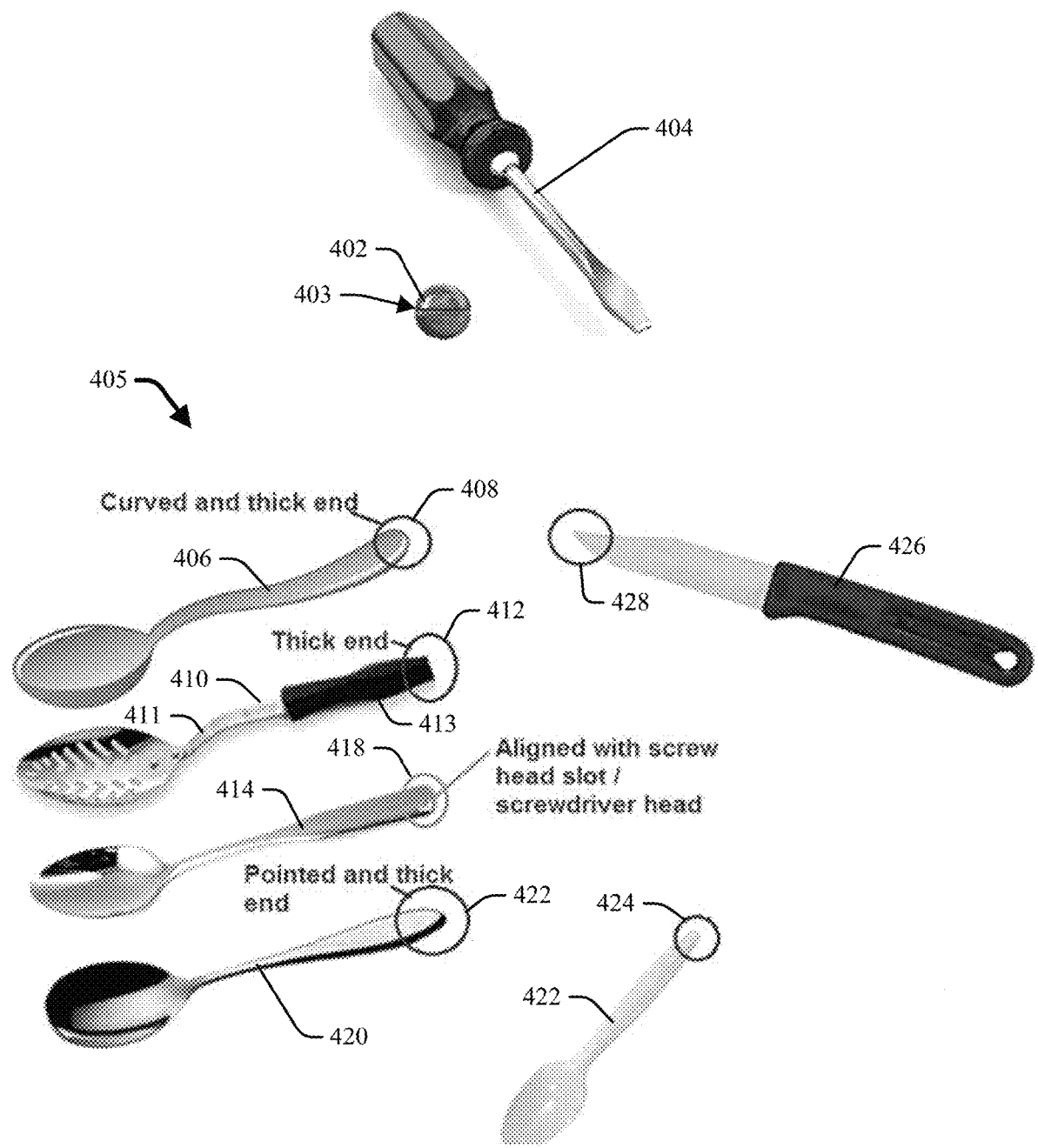
FIG. 7 is a graphical illustration of a work-piece, tool and a model set of substitute tools according to the present invention.

With reference to an example illustrated in FIG. 7, the configured processor at 306 determines length, depth and width dimensions of an engagement area slot 403 of a work-piece screw head 402; and at 308, length, depth and width dimensions of an operating area constraint encompassing the screw head slot 403 and projecting outward from the screwhead 402 on a clearance radius from a central axis of the screw about the which the screw rotates to tighten or loosen upon a thread engagement with another work-piece (not shown), wherein the clearance radius is a length from the axis of the screw that defines minimum dimensions of a volume of space that is free of visible obstructions from surrounding structures, and so that a substitute tool will fit within the operating area and engage the work-piece engagement area (screw head slot 403) and freely rotate the engaged screw head slot 403 without obstruction from surrounding elements (for example, sidewalls, solid edges, gearing pieces, etc.)

Determining contextual constraints at 308 may also include environmental constraints. For example, the configured processor may set atmospheric pressure data obtained from barometric sensors as a minimum operative atmospheric pressure for the substitute tool; determine that the substitute tool must meet a moisture constraint, to function under water or in rain or other damp conditions, as determined by image or water sensor data or weather data sensor inputs or weather prediction data; and still other operating environment condition constraints will be apparent to one skilled in the art.

At 310 the configured processor creates (defines, etc.) a model set of alternate, substitute devices, tools or solutions that each have body portions with dimensions that fit the physical dimensions of the work-piece engagement area and are identified as available within an environment of the robot. The model set tools may be identified as objects visible (via image data analysis) within camera data feeds of an environment of the robot; or as indexed to or flagged in association with the specific missing tool, the executed action and/or the physical dimensions of the work-piece engagement area in a tool knowledge base, such as within an object data repository 301 and indexed to respective storage locations accessible to the robot. For example, the configured processor may process image data at 310 that is acquired from surroundings of the robot, including images of counters, work benches, contents of drawers opened by the robot, etc., in a physical search routine via robotic motors and appendages, to find objects having body portions of dimensions that appear to fit the engagement areas of the work-piece. The configured processor may also search drawer contents databases within the data repository 301 to find associated or indexed objects and their indicated locations (which drawer or utensil bin, etc.).

Thus, FIG. 7 illustrates one model set of substitute tools 405 generated by the configured processor at 310 in response to analyzing image data to identify objects within a kitchen-area domain of the configured processor robot, wherein the configured processor determines that each has a body portion defined by dimensions that meet thresholds of (fit) the work-piece screw 402 slot 403 length, width, and depth dimensions: a ladle 406 having a curved handle end shape portion 408; a slotted spoon 410 having a flat handle end shape portion 412; a table spoon 414 having a flat handle end shape portion 418; a soup spoon 420 having a pointed handle end shape portion 422; a plastic spoon 422 having a flat, planar handle end shape portion 424; and a knife 426 having a pointed blade tip portion 428.

At 312 the configured processor selects a lowest-cost, best (highest ranked, weighted, rated or scored) tool of the visual model set for use as a substitute tool to execute the specified action upon the work-piece as a function of comparing respective dimension, material, replacement cost and risk of damage values associated with executing the specified action. More particularly, the configured processor compares their respective dimensions, materials, shapes, and body orientations, replacement costs and risk of damage associated with the executed action as a function of knowledge base data associated or indexed to each potential tool of the visual model set within the object data repository 301.

Thus, referring to again to the example of FIG. 7, the configured processor determines at 312 that the ladle 406 is ranked lowest relative to the other possible tools, due to a low (below threshold) likelihood that its curved handle end shape 408 will both fit within the tolerances of the dimensions of the screw slot 403, and remain engaged therein during a rotation specified by the executed action. The configured processor further ranks the slotted spoon 410 next-lowest relative to the remainder, other possible tools 414, 420, 422 and 426 as a function of determining a low relative likelihood that its thick flat handle end shape 412 will fully fit within the screw slot 403 and remain engaged during said rotation, and due to identifying a material mismatch between its metal body 411 and plastic handle 413 material (as determined from image analysis that distinguishes the different portions 411 and 413 and matches each to different material image data within the object data repository 301) that increases a high risk that the slotted spoon 410 will break under torque operational forces likely required to execute the specified un-screwing action.

At 312 the configured processor ranks the knife 426 and the soup spoon 420 higher for selection than the ladle 406 and slotted spoon 410 in response to determining that the pointed shapes of their respective blade tip 428 and handle end 422 conform more closely to the physical dimensions of the work-piece engagement area are therefore more likely to fully fit within the screw slot 403 and remain engaged during rotation, and thereby that each has a higher likelihood of success in execution. The configured processor further ranks the soup spoon 420 higher for selection over the knife 426 in response to determining a higher likelihood or risk that that the blade tip 428 may be damaged by the operative torque forces relative to the pointed handle end 422, and that the knife 426 has a higher replacement cost for damage relative to the spoon 420.

At 312 the configured processor ranks the flat handle end shape 418 of the table spoon 414 and the flat, planar handle end shape 424 of the plastic spoon 422 with higher fit score values relative to scores assigned to the other tools 406, 410, 420 and 426 within the visual model set 405. The configured processor gives the plastic spoon 422 a highest fit score at 312, in response to determining via image analysis that dimensions of the flat planar handle end shape 424 conform most closely to the dimensions determined for the slot 403. However, the configured processor assigns a lower material strength score to the plastic spoon 422, relative to a material strength score that it assigns to the table spoon 414, as functioning or comparing their respective material strengths indicated in the object data repository 301.

At 312 the configured processor weights the fit scores and the material strength scores as a function of the torque forces determined for the specified action, and/or the condition of the screw 403 indicated by the contextual constraints determined at 308 (for example, level or amount of rust or lubrication determined in the visual data). In the example of FIG. 7, a weighting of a risk-of-loss cost or factor is increased in proportion to the torque forces anticipated or estimated for executing the action, so that the knife 426 cannot be chosen (ranked highest) to open a tight screw 402, even though it may have the best dimension, shape and orientation attributes, due to the higher risk of loss cost. Similarly, the configured processor determines that the torque forces are substantial and likely to result in failure of the plastic material used to form the plastic spoon 422, and accordingly weights the material strength score to have a more determinative effect than the fit score in generating the tool selection rankings, resulting in an overall ranking of the table spoon 414 over the plastic spoon 422, and the other tools, for selection for use as a substitute tool. Thus, even though the plastic spoon 422 handle end 424 provides the best fit to the slot 403, the next-best-fit tool with a better material strength score, the configured processor ranks the table spoon 414 highest for selection at 312.

The terminology used herein is for describing aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A robotic tool selection method, comprising the steps of:
   in response to determining that a specified tool is not available for use in executing a rotation action on a standardized work-piece, a robotic device determining, via graphical image analysis, physical attributes of an engagement area slot of the standardized work-piece that the specified tool physically engages to execute the rotation action, wherein the physical attributes comprise slot length, depth and width dimensions;
   identifying, via image analysis that distinguishes between different body portions and matches each of the different body portions to different material image data within an object data repository, a model set plurality of alternate substitute tools that are each available within a physical environment of the engagement area and have a body portion end shape with physical dimensions that conform to the physical dimensions of the work-piece engagement area slot to fit within the slot and comprise a thickness dimension that is less than the width dimension of the engagement area slot by a threshold value;
   performing a feasibility analysis on the plurality of alternate substitute tools to determine material properties and operative capacities of each alternate substitute tool of the plurality of alternate substitute tools, wherein the material properties and operative capacities are obtained from a tool knowledge base;
   performing a contextual analysis of the rotation action to be executed on the standardized work-piece, wherein the contextual analysis determines, in part, an estimated torque required to rotate the standardized work-piece based on previous executions of the rotation action on the standardized work-piece by historic tools including the specified tool and other alternate substitute tools;
   identifying, based on the feasibility analysis, a subset of alternate substitute tools from the plurality of alternate substitute tools that have a material modulus value that exceeds the estimated torque required to rotate the standardized work-piece in the rotation action by a threshold percentage value of the estimated torque;
   selecting a substitute tool for the specified tool from the subset of alternate substitute tools, wherein the selected substitute tool has a lowest failure cost value relative to failure cost values of each of remaining others of the subset of alternate substitute tools; and
   executing, by the robotic device, the rotation action on the standardized work-piece using the selected substitute tool.

2. The method of claim 1, further comprising:
   integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the determining via graphical image analysis the physical attributes of the work-piece engagement area slot, the identifying the model set plurality of alternate substitute tools, and the selecting the substitute tool.

3. The method of claim 2, wherein the computer-readable program code is provided as a service in a cloud environment.

4. The method of claim 1, further comprising:
   identifying the model set plurality of alternate substitute tools as tools that each have body portion material properties that are compatible to atmospheric and environmental attributes of the engagement area.

5. The method of claim 4, wherein the selecting the substitute tool comprises selecting a first tool of the subset of alternate substitute tools that has a first body portion that conforms less closely to the physical dimensions of the work-piece engagement area slot than a second body portion of a different, second tool of the subset of alternate substitute tools, in response to determining that the first tool has a lower replacement cost than the second tool.

6. The method of claim 4, wherein the determined physical attributes of the engagement area comprise a material composition of the work-piece engagement area, and a material strength of the material composition of the work-piece engagement area slot; and wherein the selecting the substitute tool comprises selecting a third tool of the subset of alternate substitute tools that has a third body portion that conforms less closely to the physical dimensions of the work-piece engagement area slot than a fourth body portion of a different, fourth tool of the subset of alternate substitute tools, in response to determining that the third tool is formed from a material having a greater material strength than a different material used to form the fourth tool.

7. The method of claim 4, wherein the identifying the model set plurality of alternate substitute tools as tools that each have body portion material properties that are compatible to atmospheric and environmental attributes of the engagement area comprises determining a compatibility of material properties of each of the plurality of alternate substitute tools to an environmental attribute of the engagement area that is selected from the group consisting of liquid-resistant material integrity, spark-free surface characteristics and non-conductive properties.

8. The method of claim 4, further comprising:
   determining constraints for the substitute tool selection comprising a range of motion of a tool required to execute the specific action, and physical dimensions of an engagement action area encompassing the engagement area within which each of the plurality of alternate substitute tools operate in the range of motion in executing the rotation action.

9. A system, comprising:
a processor;
a computer readable memory in circuit communication with the processor; and a computer readable storage medium in circuit communication with the processor; wherein the processor executes program instructions stored on the computer-readable storage medium via the computer readable memory and thereby:
in response to determining that a specified tool is not available for use in executing a rotation action on a standardized work-piece, determines via graphical image analysis physical attributes of an engagement area slot of the standardized work-piece that the specified tool physically engages to execute the rotation action, wherein the physical attributes comprise slot length, depth and width dimensions;
identifies, via image analysis that distinguishes between different body portions and matches each of the different body portions to different material image data within an object data repository, a model set plurality of alternate substitute tools that are each available within a physical environment of the engagement area and have a body portion end shape with physical dimensions that conform to the physical dimensions of the work-piece engagement area slot to fit within the slot and comprise a thickness dimension that is less than the width dimension of the engagement area slot by a threshold value;
performs a feasibility analysis on the plurality of alternate substitute tools to determine material properties and operative capacities of each alternate substitute tool of the plurality of alternate substitute tools, wherein the material properties and operative capacities are obtained from a tool knowledge base;
performs a contextual analysis of the rotation action to be executed on the standardized work-piece, wherein the contextual analysis determines, in part, an estimated torque required to rotate the standardized work-piece based on previous executions of the rotation action on the standardized work-piece by historic tools including the specified tool and other alternate substitute tools;
identifies, based on the feasibility analysis, a subset of alternate substitute tools from the plurality of alternate substitute tools that have a material modulus value that exceeds the estimated torque required to rotate the standardized work-piece in the rotation action by a threshold percentage value of the estimated torque;
selects a substitute tool for the specified tool from the subset of alternate substitute tools, wherein the selected substitute tool has a lowest failure cost value relative to failure cost values of each of remaining others of the subset of alternate substitute tools; and
sends, to a robotic device, a command to execute the rotation action on the standardized work-piece using the selected substitute tool.

10. The system of claim 9, wherein the processor executes the program instructions stored on the computer-readable storage medium via the computer readable memory and thereby:
identifies the model set plurality of alternate substitute tools as tools that each have body portion material properties that are compatible to atmospheric and environmental attributes of the engagement area.

11. The system of claim 10, wherein the processor executes the program instructions stored on the computer-readable storage medium via the computer readable memory and thereby selects the substitute tool by selecting a first tool of the subset of alternate substitute tools that has a first body portion that conforms less closely to the physical dimensions of the work-piece engagement area slot than a second body portion of a different, second tool of the subset of alternate substitute tools, in response to determining that the first tool has a lower replacement cost than the second tool.

12. The system of claim 10, wherein the determined physical attributes of the engagement area comprise a material composition of the work-piece engagement area, and a material strength of the material composition of the work-piece engagement area slot; and wherein the processor executes the program instructions stored on the computer-readable storage medium via the computer readable memory and thereby selects the substitute tool by selecting a third tool of the subset of alternate substitute tools that has a third body portion that conforms less closely to the physical dimensions of the work-piece engagement area slot than a fourth body portion of a different, fourth tool of the subset of alternate substitute tools, in response to determining that the third tool is formed from a material having a greater material strength than a different material used to form the fourth tool.

13. The system of claim 10, wherein the processor executes the program instructions stored on the computer-readable storage medium via the computer readable memory and thereby identifies the model set plurality of alternate substitute tools as tools that each have body portion material properties that are compatible to atmospheric and environmental attributes of the engagement area, and determines a compatibility of material properties of each of the plurality of alternate substitute tools to an environmental attribute of the engagement area that is selected from the group consisting of liquid-resistant material integrity, spark-free surface characteristics and non-conductive properties.

14. The system of claim 10, wherein the processor executes the program instructions stored on the computer-readable storage medium via the computer readable memory and thereby determines constraints for the substitute tool selection comprising a range of motion of a tool required to execute the rotation action, and physical dimensions of an engagement action area encompassing the engagement area within which each of the plurality of alternate substitute tools operate in the range of motion in executing the rotation action.

15. A computer program product for cognitive robotic substitute tool selection and application, the computer program product comprising:
a computer readable storage medium having computer readable program code embodied therewith, wherein the computer readable storage medium is not a transitory signal per se, the computer readable program code comprising instructions for execution by a processor that cause the processor to:
in response to determining that a specified tool is not available for use in executing a rotation action on a standardized work-piece, determine via graphical image analysis physical attributes of an engagement area slot of the standardized work-piece that the specified tool physically engages to execute the rotation action, wherein the physical attributes comprise slot length, depth and width dimensions;
identify, via image analysis that distinguishes between different body portions and matches each of the different body portions to different material image data within an object data repository, a model set plurality of alternate substitute tools that are each available within a physical environment of the engagement area and have a body portion end shape with physical dimensions that conform to the physical dimensions of the work-piece engagement area slot to fit within the slot and comprise a thickness dimension that is less than the width dimension of the engagement area slot by a threshold value;

perform a feasibility analysis on the plurality of alternate substitute tools to determine material properties and operative capacities of each alternate substitute tool of the plurality of alternate substitute tools, wherein the material properties and operative capacities are obtained from a tool knowledge base;

perform a contextual analysis of the rotation action to be executed on the standardized work-piece, wherein the contextual analysis determines, in part, an estimated torque required to rotate the standardized work-piece based on previous executions of the rotation action on the standardized work-piece by historic tools including the specified tool and other alternate substitute tools;

identify, based on the feasibility analysis, a subset of alternate substitute tools from the plurality of alternate substitute tools that have a material modulus value that exceeds the estimated torque required to rotate the standardized work-piece in the rotation action by a threshold percentage value of the estimated torque;

select a substitute tool for the specified tool from the subset of alternate substitute tools, wherein the selected substitute tool has a lowest failure cost value relative to failure cost values of each of remaining others of the subset of alternate substitute tools; and send, to a robotic device, a command to execute the rotation action on the standardized work-piece using the selected substitute tool.

16. The computer program product of claim 15, wherein the computer readable program code instructions for execution by the processor further cause the processor to:
identify the model set plurality of alternate substitute tools as tools that each have body portion material properties that are compatible to atmospheric and environmental attributes of the engagement area.

17. The computer program product of claim 16, wherein the computer readable program code instructions for execution by the processor further cause the processor to select the substitute tool by selecting a first tool of the subset of alternate substitute tools that has a first body portion that conforms less closely to the physical dimensions of the work-piece engagement area slot than a second body portion of a different, second tool of the subset of alternate substitute tools, in response to determining that the first tool has a lower replacement cost than the second tool.

18. The method of claim 1, wherein the standardized work-piece comprises a screw head with a standardized numerical rating.

* * * * *